United States Patent
Li et al.

(10) Patent No.: US 7,124,271 B2
(45) Date of Patent: Oct. 17, 2006

(54) METHOD AND SYSTEM FOR ALLOCATING REGISTER LOCATIONS IN A MEMORY DURING COMPILATION

(75) Inventors: Long Li, Shanghai (CN); Bo Huang, Shanghai (CN); Jinguan Dai, Shanghai (CN); Luddy Harrison, Chestnut, MA (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 10/684,770

(22) Filed: Oct. 14, 2003

(65) Prior Publication Data

US 2005/0102658 A1    May 12, 2005

(51) Int. Cl.
*G06F 12/00* (2006.01)
(52) U.S. Cl. ........................ 711/170; 711/172
(58) Field of Classification Search .............. 711/170, 711/171, 172, 173; 717/140, 156
See application file for complete search history.

(56) References Cited

U.S. PATENT DOCUMENTS

| | | | | |
|---|---|---|---|---|
| 5,367,684 A | * | 11/1994 | Smith | 717/140 |
| 5,890,000 A | * | 3/1999 | Aizikowitz et al. | 717/154 |
| 6,090,156 A | * | 7/2000 | MacLeod | 717/157 |
| 6,349,364 B1 | * | 2/2002 | Kai et al. | 711/133 |
| 6,523,173 B1 | * | 2/2003 | Bergner et al. | 717/152 |
| 6,549,983 B1 | * | 4/2003 | Han et al. | 711/120 |
| 2004/0064811 A1 | * | 4/2004 | Altmejd | 717/159 |
| 2005/0039175 A1 | * | 2/2005 | Tatge et al. | 717/156 |

* cited by examiner

*Primary Examiner*—Hiep T. Nguyen
(74) *Attorney, Agent, or Firm*—L. Cho

(57) ABSTRACT

A compiler includes a location-assigning module to optimally allocate register locations in various memory blocks of a memory during compilation of a program code in accordance with code proximity of the program code in accessing the register locations and size of each of the memory blocks.

24 Claims, 8 Drawing Sheets

FIG. 8

| Iteration # | Number of partition after this iteration | Number of home locations in each partition after this iteration |
|---|---|---|
| 1 | M/2 | 2 |
| 2 | M/4 | 4 |
| 3 | M/8 | 8 |
| ... | ... | ... |
| n-1 | $M/(2^{n-1})$ | $2^{n-1}$ |
| n | M/N | N |

METHOD AND SYSTEM FOR ALLOCATING REGISTER LOCATIONS IN A MEMORY DURING COMPILATION

FIELD

An embodiment of the present invention pertains to compilation and execution of software programs. More specifically, an embodiment of the present invention relates to a method and system of optimally allocating spilling home locations in a memory during compilation of a program code in order to increase runtime performance of the compiled code.

BACKGROUND

A computer system typically includes, among other things, a processor as a Central Processing Unit (CPU) and a separate memory system (i.e., main memory) to store information processed by the CPU. One problem of this computer architecture is that the performance of the processor tends to be negatively impacted by the main memory. This is due to the fact that the processing speed of a typical main memory tends to be slower than that of a processor. This typically causes the processor to stall when attempting to access a location in the main memory.

In order to achieve higher performance for computer processors, a local memory (or cache) has been proposed to be included within the processor to boost the performance of the processor. The local memory is organized like high-speed registers. FIG. 1 shows the memory layout of one prior local memory 10. As can be seen from FIG. 1, the local memory 10 can be viewed as indexed register files. Any specific local memory entry (e.g., the entry 12) is selected based on the value in a base address register plus an offset. Because the local memory 10 is divided into several continuous blocks, the value of base address register is required to be aligned on block size. The local memory 10 can be read and written as fast as general registers, and supplies to the execution data-paths as source operands and receives results as destination operands.

Compilation is a process in which a compiler transforms source code into a processor-executable native or machine code. During compilation of a program, every variable used in the program must at some time be placed in a processor register for execution of some instruction. This is referred to as register allocation. However, a computer processor typically only has a limited number of registers that is usually much smaller than the number of variables in a program executing on the processor. This makes it impossible to simply assign a register to each variable.

To solve this problem, every variable is placed in a "symbolic register" by the compiler. The compiler then only places those symbolic registers needed for the current execution in the hardware registers and spills all other symbolic registers to another storage when there are some conflicts of hardware registers (usually the main memory) and reload them only when needed. This technique is referred to as "spilling". The inclusion of the local memory allows the compiler to use the faster local memory instead of main memory as the spilling home location, thus reducing the cost of reloading and storing.

One problem associated with the spilling-to-local-memory technique is that if the symbolic registers are not stored in proper locations within the local memory, it may cause a relatively large number of initialization operations to base address register when accessing the spilled registers. As is known, the initialization operation to base address register is a relatively expensive operation (e.g., 3 cycles delay between the write to the base address register and the value changed on IXP). Thus, the relatively large number of initialization operation typically negatively impacts the runtime performance of the compiled program. FIG. 2 illustrates this problem.

As shown in FIG. 2 for the purpose of illustration, a local memory block is assumed to only contain two entries and three spilling home locations for symbolic registers A, B and C that need to be spilled to the local memory. The spilling order of these spilling home locations is also shown in FIG. 2. The spilling home locations A and B are in the memory entries 21 and 22 of one memory block while the spilling home location C is in a different memory block that contain the memory entry 23 (the other memory entry of that memory block is not shown in FIG. 2). For this spilling order, the spilling home locations A and B can be accessed with the same base address while the home location C must be accessed with a different base address. FIG. 2 also shows the access order (i.e., A, B, A, C, A, C) of the home locations (either for spilling or reloading).

In this case and as can be seen from the pseudo code accessing sequence in FIG. 2, four initialization operations to base address register are needed for the spilling order and access order as shown in FIG. 2. It is also assumed here that each instruction can access only one register spilling location with constant address, which is always true for each spilling and reloading. But if the spilling order of these home locations could be rearranged in another way (e.g., putting the home locations A and C into the same local memory block), then only three initialization operations to base address register may be needed.

Thus, there exists a need for a method and system of optimally allocating register locations in a memory during compilation of a program code in order to increase runtime performance of the compiled code.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 8 is a table showing the result of the memory block assigning process of FIG. 7.

DETAILED DESCRIPTION

Figure 3:
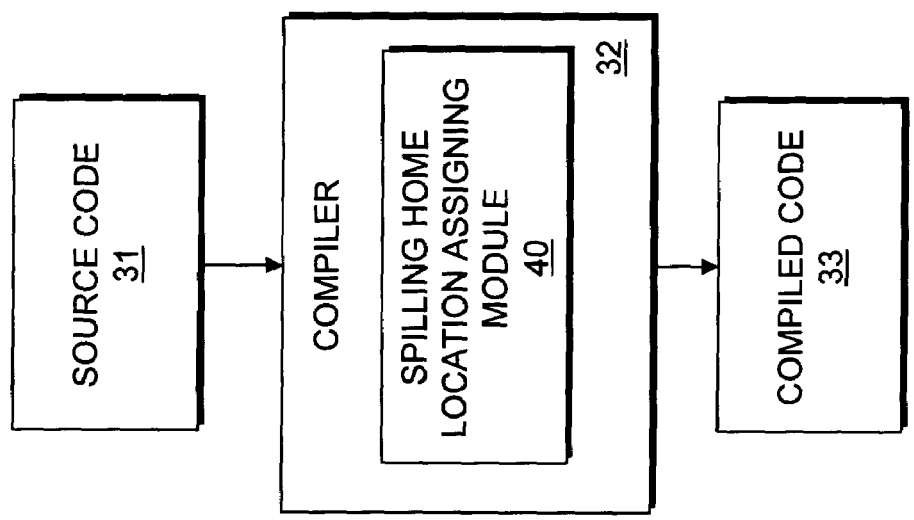
FIG. 3 is a functional block diagram depicting a compilation process by a compiler that includes a spilling home location assigning module that implements one embodiment of the present invention.
Figure 4:
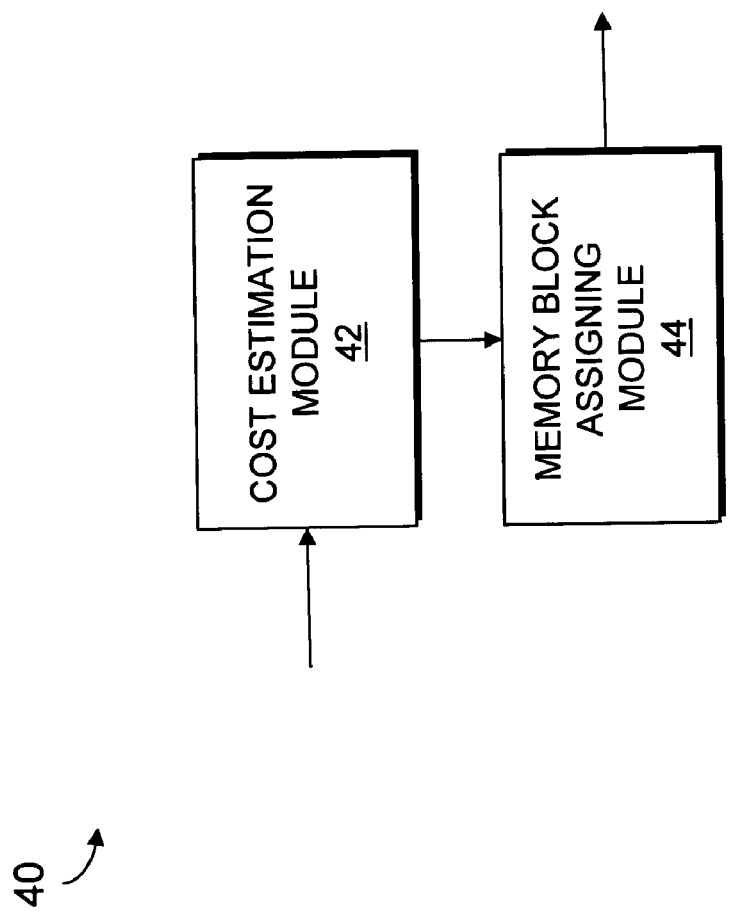
FIG. 4 shows the structure of the spilling home location assigning module of FIG. 3 that includes a cost estimation module and a memory block assigning module.

FIG. 3 shows a compilation process by a compiler 32 that includes a spilling home location assigning module 40 that implements one embodiment of the present invention. FIG. 4 shows in more detail the spilling home location assigning module 40 that includes a cost estimation module 42 and a memory block assigning module 44. In accordance with one embodiment of the present invention, the spilling home location assigning module 40 optimally allocates or assigns register spilling home locations (or spilled symbolic registers) in various memory blocks of a memory during compilation of a program source code 31 in order to increase runtime performance of the compiled code (i.e., the compiled code 33).

As will be described in more detail below, the spilling home location assigning module 40 optimally allocates or assigns register spilling home locations in various memory blocks by arranging or rearranging the relative order of these register spilling home locations in accordance with the code proximity of the program code in accessing these register locations and the size of each of the memory blocks. To accomplish this, the cost estimation module 42 of the spilling home location assigning module 40 estimates cost between any two adjacent locations using a forward disjunctive dataflow analysis. The cost estimation module 42 then generates a cost matrix for all spilling home locations. The memory block assigning module 44 of the spilling home location assigning module 40 then assigns or reassigns the register spilling home locations based on the estimated cost between any two adjacent locations such that minimized initialization operations to base address register are needed to access these register spilling home locations in the memory.

The cost estimation module 42 estimates the cost between any two adjacent locations by determining the number of initialization operations to any base address register for any memory block that are required to access these two adjacent locations if the two adjacent locations were not put into the same memory block. The memory block assigning module 44 assigns the register spilling home locations by assigning a same memory block to several register locations if the estimated cost among them is relatively high according to the sorting result (The costs between each pairs are sorted. The costs are chosen from high to low.). The structure and operation of the spilling home location assigning module 40 will be described in more detail below, also in conjunction with FIGS. 3 through 8.

In FIG. 3, the compiler 32 is shown to compile the source code 31 into the compiled code 33. The source code 31 is a software program written in one of known high-level programming languages. The compiled code 33 may be native code that can be directly executed on a data processing or computer system. The term native code means machine code that is particular to a specific architecture or platform. Alternatively, the compiled code 33 can also be an intermediate language code (e.g., Java byte-code) that may then be interpreted or subsequently compiled by a just-in-time (JIT) compiler within a runtime system (or virtual machine) into native or machine code that can be executed by a platform-specific target computer system.

The source code 31 can be stored in a memory of a computer system (both not shown) before being compiled by the compiler 32. The compiled code 33 can be stored in, for example, a memory of a computer system (both not shown) that will execute the compiled code 33. In one embodiment, the source code 31 and the compiled code 33 are stored in a memory of the same computer system. In an alternative embodiment, the source code 31 and the compiled code 33 are stored in different computer systems.

The compiler 32 is a software system hosted by (or run on) the computer system. The computer system can be, for example, a personal computer, a personal digital assistant, a network computer, a server computer, a notebook computer, a workstation, a mainframe computer, or a supercomputer. Alternatively, the computer system can be of any other electronic system with data processing capabilities.

The computer system includes an operating system (not shown) and system-specific hardware (not shown). The operating system can be an open standard Linux operating system or other type of operating system. The system-specific hardware of the computer system can be any hardware that includes all necessary modules to execute the operating system sufficiently. This includes a processor or microprocessor as CPU of the computer system.

As part of the compilation process, the compiler 32 needs to assign, at some time, every variable used in the source code 31 to a hardware processor register for execution of some instruction. This is referred to as register allocation. However, because a computer processor typically only has a limited number of registers that is usually much smaller than the number of variables in a program executing on the processor, it impossible to simply assign a processor register to each variable. Instead, every variable is placed in a "symbolic register" by the compiler 32. The compiler 32 then only places those symbolic registers needed for the current execution in the hardware processor registers and spills all other symbolic registers to a memory (not shown) and reload those spilled symbolic registers only when needed. This technique is referred to as "spilling" or "register spilling". As descried above, the spilled symbolic registers in the memory may be referred to as register spilling home locations.

In one embodiment, the memory is a local memory within a processor. In this case, the local memory is organized into a number of memory blocks, each being accessed with a base address (stored in a base address register) that points to the first entry of the block. All other entries within that memory block can be accessed with the base address plus an offset. In another embodiment, the memory is an indexed register file within a processor. In alternative embodiments, the memory can be other memory systems. For example, the memory can be a main memory within a computer system.

In accordance with one embodiment of the present invention, the compiler 32 employs the spilling home location assigning module 40 to optimally allocate or assign register spilling home locations in various memory blocks of the memory during spilling such that minimized initialization operations to base address register are needed to access these register spilling home locations in the memory. This in turn increases runtime performance of the compiled code 33. The spilling home location assigning module 40 achieves this by arranging or rearranging the relative order of these register spilling home locations in the memory in accordance with the code proximity of the compiled code 33 in accessing these register locations and the size of each of the memory blocks of the memory.

In one embodiment, spilling home location assigning module 40 is implemented using software technology. Alternatively, the spilling home location assigning module 40 can be implemented using other technology. For example, the spilling home location assigning module 40 may be implemented as firmware.

As can be seen from FIG. 4, the cost estimation module 42 of the spilling home location assigning module 40 is employed to estimate the cost between any two register spilling home locations. The cost estimation module 42 estimates the cost by determining how many initialization operations to the base address register are required to access these two locations if the two locations were not put into the same memory block. The cost estimation module 42 then generates a cost matrix that contains the estimated cost of all register spilling home locations. The memory block assigning module 44 of the spilling home location assigning module 40 then assigns the register spilling home locations by assigning several register spilling home locations to a same memory block if the estimated cost among them is relatively high according to the sorting result.

In one embodiment, the predetermined high level means that the cost among these locations is of the same high value. In other embodiments, the predetermined high level means that the cost among these locations is not of the same high value. The predetermined high level can be determined based on the size of each memory block and the number of memory blocks within the memory.

The cost estimation module 42 estimates the cost using a forward disjunctive dataflow analysis to analyze the data flow of the program code (i.e., the source code 31 of FIG. 3). The forward disjunctive dataflow analysis is based on a simplified flow graph of the program code. The simplified flow graph means that those instructions in the program code that contain no access to register spilling home locations are purged off and each flow node includes only one instruction. In the simplified flow graph, flow node and instruction have the same meaning.

Using the forward disjunctive dataflow analysis and the simplified flow graph, the cost estimation module 42 first generates a bit-set. Each bit in the bit-set represents a register spilling home location. Then GEN and KILL information for each instruction is calculated. The GEN information represents that the instruction contains an access to a register spilling home location. The KILL information represents that the instruction contains no access to a register spilling home location. During the iteration of calculating the GEN and KILL information for each instruction, the bit which represents the spilling home location that the current instruction accesses will be generated (e.g., set at ONE) and all the other bits will be killed (e.g., set at ZERO). For each instruction i, the data flow equations are as follows:

$$\begin{cases} GEN[i] = \{L \mid L \text{ is the home location accessed by instruction } i\} \\ KILL[i] = \left\{ \begin{array}{l} L \mid L \text{ is the home location} \\ \text{not accessed by instruction } i \end{array} \right\} \\ IN[i] = \bigcup_{p \in Pred(i)} OUT[p] \\ OUT[i] = GEN[i] \cup (IN[i] - KILL[i]) \end{cases}$$

The forward disjunctive dataflow analysis is iterated until both IN and OUT are converged. Here, IN represents information at entry of an instruction, and OUT represents information at exit of an instruction. The GEN and KILL values are used for calculating the IN and OUT values.

Figure 1:
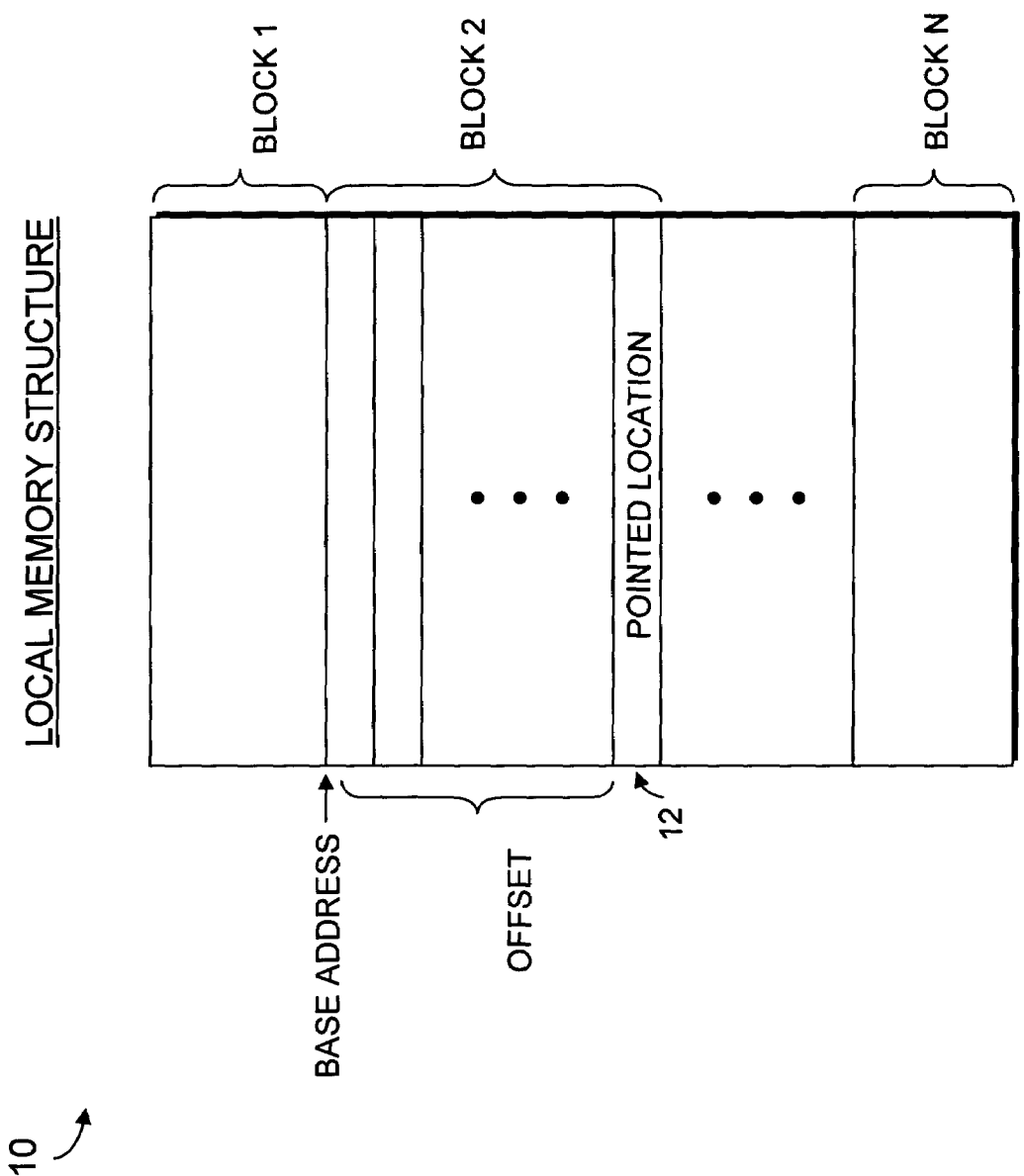
FIG. 1 shows a typical local memory layout.
Figure 2:
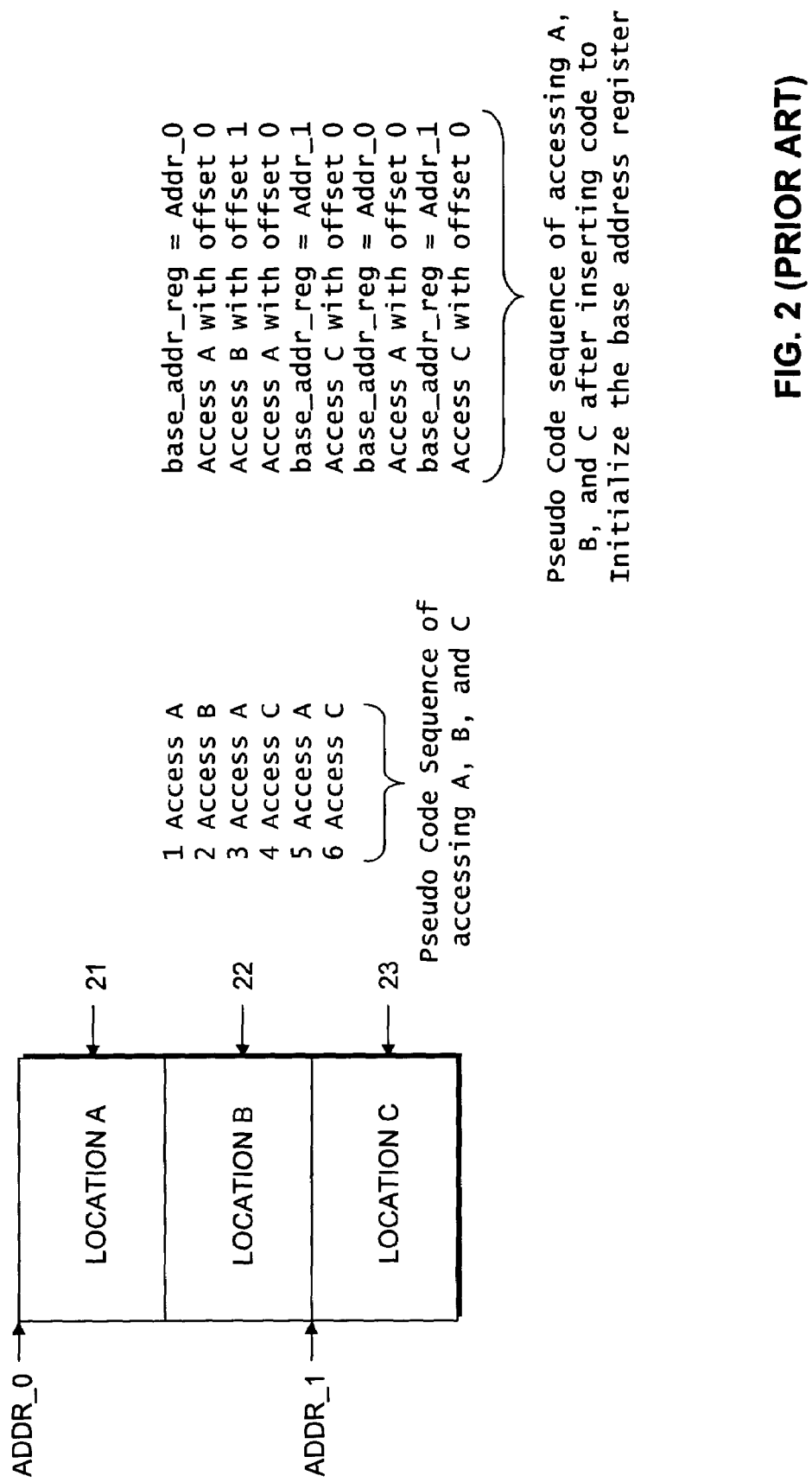
FIG. 2 shows one exemplary prior art register spilling home location layout and its accessing code sequence.

For example and for illustration purposes, the access code sequence as shown in FIG. 2 can be used for the data flow analysis and cost estimation. For the sequential accesses as shown in FIG. 2, the GEN and KILL values for each instruction (or flow node) in accessing the register spilling home locations A, B, and C can be calculated using the above equations as follows:

GEN (1)={A} KILL (1)={B, C}
GEN (2)={B} KILL (2)={A, C}
GEN (3)={A} KILL (3)={B, C}
GEN (4)={C} KILL (4)={A, B}
GEN (5)={A} KILL (5)={B, C}
GEN (6)={C} KILL (6)={A, B}.

The above calculations allow for the values of IN and OUT to be calculated as follows:

IN (1)={} OUT (1)={A}
IN (2)={A} OUT (2)={B}
IN (3)={B} OUT (3)={A}
IN (4)={A} OUT (4)={C}
IN (5)={C} OUT (5)={A}
IN (6)={A} OUT (6)={C}.

The cost estimation module 42 then calculates the cost between two register spilling home locations based on the result of the above data flow analysis. The cost estimation module 42 uses the following technique to calculate the cost between two spilling home locations and to generate the cost matrix.

Assume the in-degree of current flow node is N and the spilling home location accessed by the current instruction is $A_1$, for any of the spilling home locations different from $A_1$ in the OUT bit-vector of each predecessor of current flow node, noted by $A_2$, the cost between $A_1$ and $A_2$ is increased by 1/N.

Because Cost[L1, L2]=Cost[L2, L1] always holds for any arbitrary register spilling home locations L1 and L2, the cost values between every two spilling home locations shown in FIG. 2 can be as follows:

Cost[A, B]=2
Cost[A, C]=3
Cost[B, C]=0.

Then the cost estimation module 42 of FIG. 4 generates the cost matrix to record the cost among all register spilling home locations. Each element of the cost matrix is initialized to be ZERO. The process of updating the cost matrix is described below, in conjunction with FIG. 6. Because the example in FIG. 2 only shows that the size of each memory block contains two entries while three register spilling home locations exist, one patched dummy home location (i.e., D) will need to be added for the cost matrix. Because the cost between any real register spilling home location and a patched dummy home location is always ZERO, the cost matrix of the register spilling home locations shown in FIG. 2 can be calculated as follows.

Cost[A, B]=2 Cost[A, D]=0
Cost[A, C]=3 Cost[B, D]=0
Cost[B, C]=0 Cost[C, D]=0.

In the example as shown in FIG. 2, the access code sequence does not include any conditional branch-out instruction. The cost matrix can still be calculated if the access code sequence contains a conditional branch-out instruction. For example, if the access code sequence is as follows, If (cond_exp)
  (1) Access B;
Else
  (2) Access C;
(3) Access A then the cost matrix can be calculated as follows,
OUT(1)={B}
OUT(2)={C} Cost[A, B]=Cost[A, B]+½
IN(3)={B,C} Cost[A, C]=Cost[A, C]+½.

Figure 6:
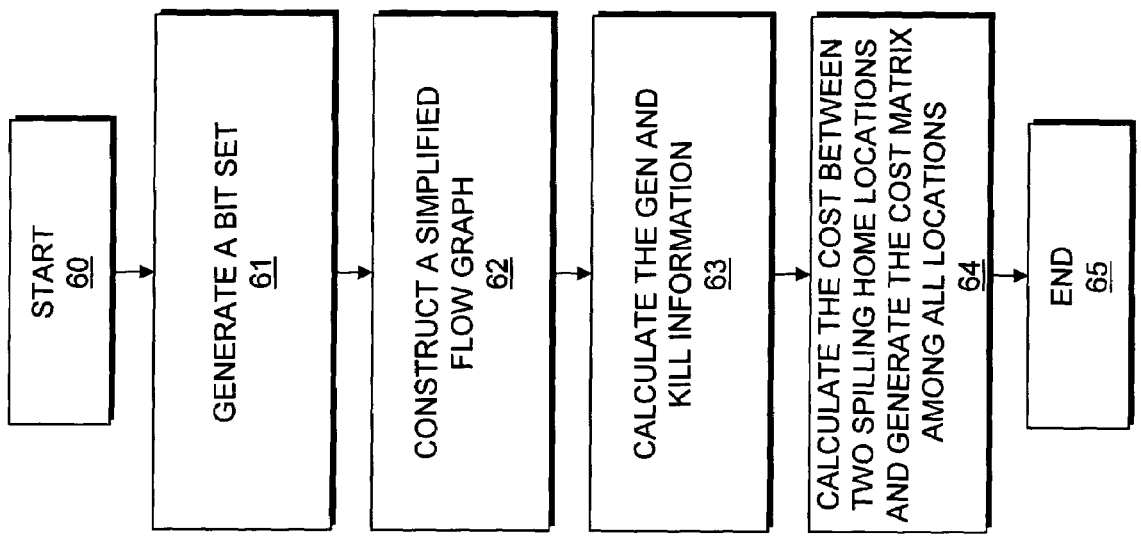
FIG. 6 is a flowchart diagram showing the cost estimation process performed by the cost estimation module of FIG. 4.

The cost estimation module 42 then supplies the cost matrix to the memory block assigning module 44 for the memory block assignment operation. FIG. 6 shows in more detail the cost estimation process performed by the cost estimation module 42, which will be described in more detail below.

Referring back to FIG. 4, the memory block assigning module 44 then assigns the register spilling home locations based on the cost matrix obtained by the cost estimation module 42. The memory block assigning module 44 does this by assigning a same memory block to several register spilling home locations if the estimated cost among them is relatively high according to the sorting result.

In one embodiment of the present invention, the memory block assigning module 44 assigns the register spilling home locations using a progressive approach. This is described in more detail below. Suppose each local memory block contains N ($N=2^n$, n>0) entries and there are M spilling home locations (M is the multiple of N after the dummy home locations patch). Instead of deciding which N entries should be put into which local memory block in one time, the memory block assigning module 44 assigns each register spilling home location in one partition. The memory block assigning module 44 then merges every two partitions into one at each cycle. At each cycle, one partition can only be merged once. Merging two partitions together means the cost between them becomes ZERO.

After the first merger, each partition will contain two spilling home locations, then four, eight etc., until each partition contains N spilling home locations. The table shown in FIG. 8 describes the relationship between the number of partition after each iteration, number of home locations in each partition after each iteration, and the iteration number.

During each merger, the cost matrix provides a standard to merge two partitions. Each element of the cost matrix will be sorted according to the value-descendant order, based on which each partition will be processed. Suppose the first cost matrix element in the ordered list is $Cost[p_1, p_2]$, then partition p1 and partition p2 will be merged into a new partition. When picking up an arbitrary cost matrix element, say $Cost[p_i, p_j]$, $p_i$ and $p_j$ can be merged into a new partition iff neither of them has been merged with another partition in current merger.

After getting M/N partitions through n iterations, each partition corresponds to a local memory block. Then the memory block assigning module 44 creates a 1:1 map between each local memory entry inside one local memory block and each spilling home location inside the corresponding partition. All those M/N 1:1 maps decide the layout of all spilling home locations.

After processing all cost matrix elements and performing partition merger at the same time when necessary, the cost matrix is required to be recalculated, i.e. new cost matrix based on the merged partitions should be calculated according to the previous cost matrix. The update to the cost matrix is a simulation to the data flow change, which makes it efficient to get the new cost matrix instead of performing another data flow analysis after each partition merger. The progressive approach generates good cost estimation between two partitions. Alternatively, the memory block assigning module 44 employs a sequential approach that sequentially assign local memory blocks to continuous N spilling home locations according to the order they appear in the list of value-descendant cost matrix element.

For arbitrary two different newly merged partitions New_P1 and New_P2, suppose New_P1 is merged from Old_P11 and Old_P12, and New_P2 is merged from Old_P21 and Old_P22, then the following formula can be used to calculate the new cost matrix element NewCost [New_P1, New_P2].

$$NewCost[New\_P1, New\_P2] := OldCost[Old\_P11, Old\_P21] +$$
$$OldCost[Old\_P11, Old\_P22] +$$
$$OldCost[Old\_P12, Old\_P21] +$$
$$OldCost[Old\_P12, Old\_P22].$$

For illustration purposes, consider again the above example shown in FIG. 2 to explain the memory block assignment process performed by the memory block assigning module 44 in more detail. As described above, the cost estimation module 42 has generated the cost matrix of the spilling home locations shown in FIG. 2 with the access code sequence also shown in FIG. 2. With the cost matrix determined, the memory block assigning module 44 initially causes every single register spilling home location to be within a partition as follows.

Partition1={A}; Partition2={B}; Partition3={C}; Partition4={D}.

After sorting, the cost vectors of the partitions are arranged in the value-descending order as follows.

Cost[1, 3]=3
Cost[1, 2]=2
Cost[2, 3]=0
Cost[1, 4]=0
Cost[2, 4]=0
Cost[3, 4]=0.

Then the memory block assigning module 44 merges any two partitions according to the above order. As first, Cost[1, 3] is processed, which results in the merger of Partition 1 and Partition 3. Then Cost[1, 2] is processed. Because Partition 1 has already merged with Partition 3, the merger between Partition 1 and Partition 2 is not allowed. Similarly, the processing of Cost[2, 3] and Cost[1, 4] will not lead to any merger either. When Cost[2, 4] is processed, Partition 2 and Partition 4 are merged together. Since the processing of Cost[3, 4] will not lead to any merger either, the final result of this iteration is as follows:
Partition 1={A, C} Partition 2={B, D}.

Then the memory block assigning module 44 calculates new cost between two new merged partitions. In this example, the new cost matrix is calculated as follows:
NewCost[1, 2]=Cost[1, 2]+Cost[1, 4]+Cost[2, 3]+Cost[3, 4].

Figure 5:
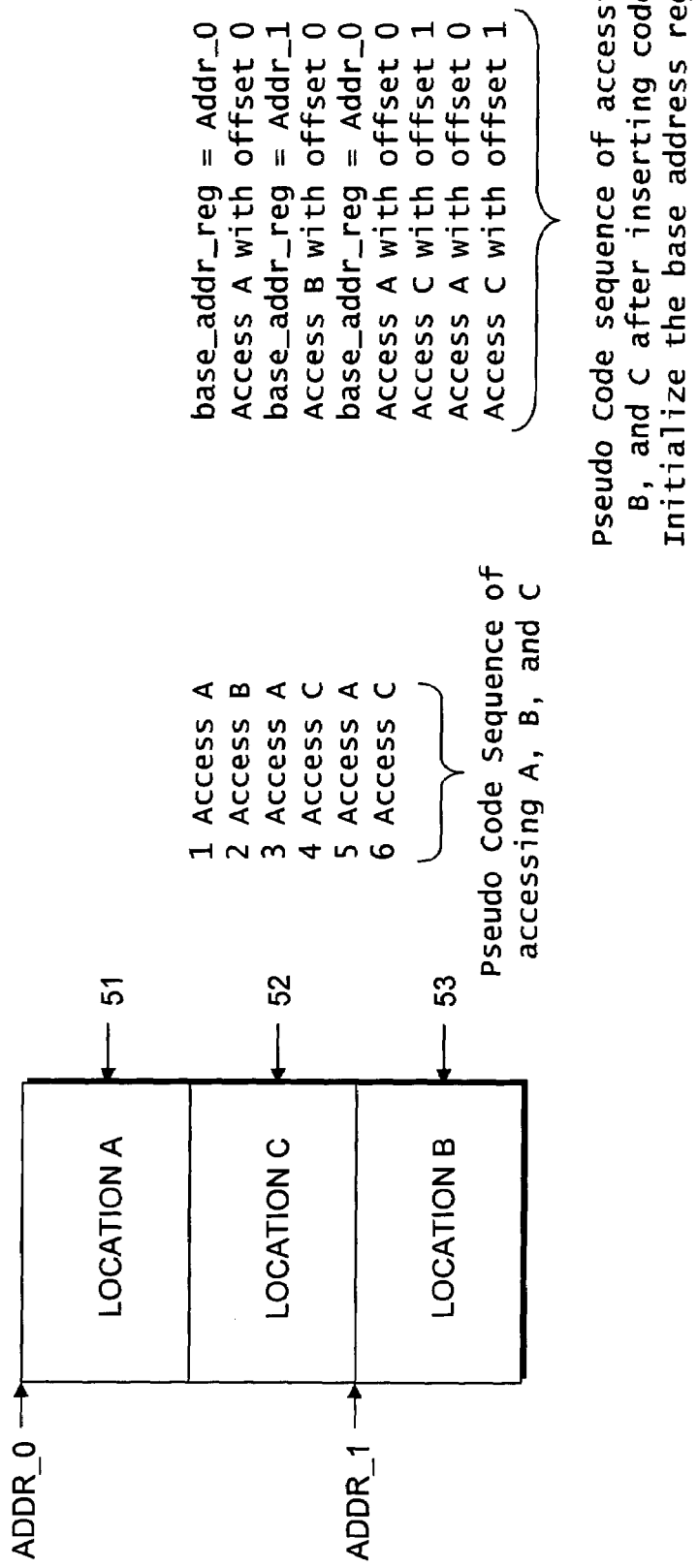
FIG. 5 shows one exemplary register spilling home location layout arranged by the spilling home location assigning module of FIG. 3 and its accessing code sequence, wherein the code sequence shows reduced initialization operations.
Figure 7:
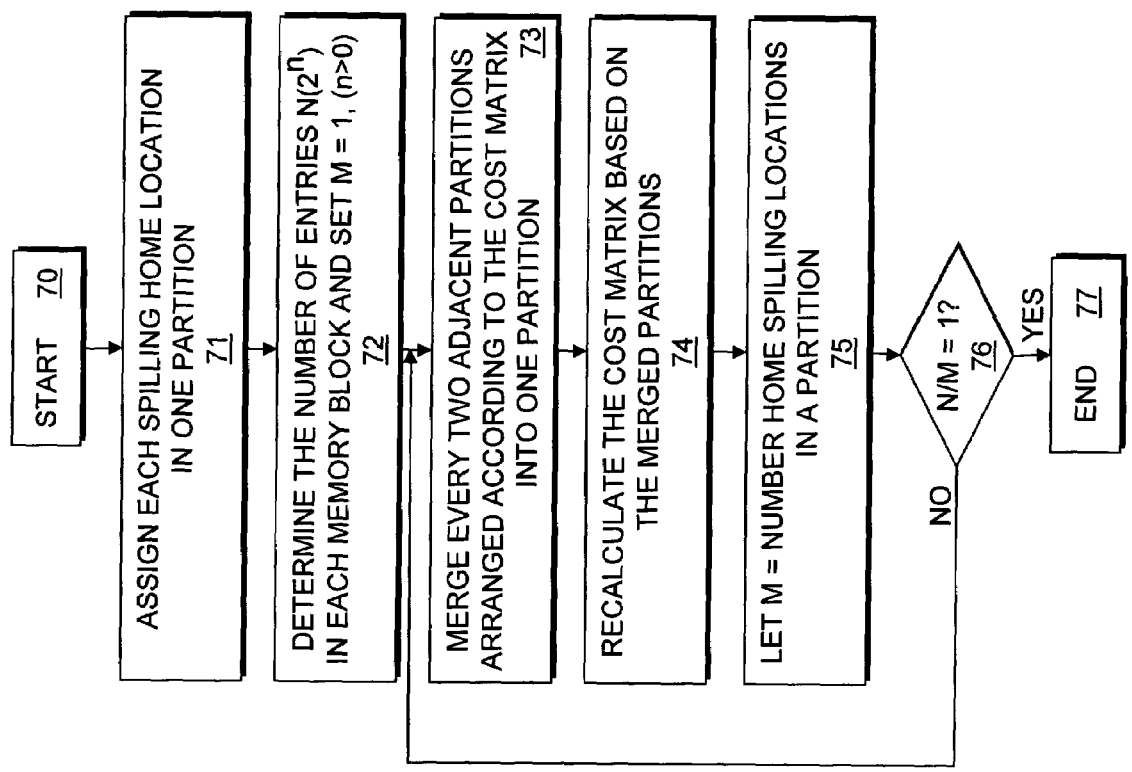
FIG. 7 is a flowchart diagram illustrating the memory block assigning process performed by the memory block assigning module of FIG. 4.

Because the new partition contains two spilling home locations and the size of the local memory block is also two, the partition merger is stopped and the local memory block assignment to the register spilling home locations can be started. As a result, the register spilling home locations A and C are allocated in the same local memory block, while the register spilling home location B is allocated in a different local memory block, as depicted in FIG. 5. As can be seen from FIG. 5, the register spilling home locations A and C are assigned in the same memory block that contains entries 51 and 52 while the register spilling home location B is assigned in a different memory block that contains entry 53. This is due to the fact that cost shown in the above cost matrix between the register spilling home locations A and C is "3" while the cost between the register spilling home location A and B is only "2". As a result of this assignment or reassignment, only three (instead of four) initialization operations are needed for accessing these locations based on the same access code sequence. This can be seen from the pseudo code accessing sequence as shown in FIG. 5. FIG. 7 shows in more detail the flow of the memory block assignment process performed by the memory block assigning module 44, which will be described in more detail below.

FIG. 6 shows the cost estimation process performed by the cost estimation module 42 of FIG. 4. As can be seen from FIG. 6, the cost estimation process starts with the data flow analysis (i.e., blocks 61–63 in FIG. 6).

At 61, the bit-set for the spilling home locations is generated. According to one embodiment of the present invention, the cost estimation module 42 (FIG. 4) generates the bit-set in which each bit represents a register spilling home location. Each bit in the bit-set contains a single binary bit of information, for example.

At 62, the simplified flow graph of the program code (i.e., the source code 31) is constructed. According to one embodiment of the present invention, the cost estimation module 42 of FIG. 4 constructs the simplified flow graph of the program code in which instructions that contain no access to register spilling home locations are purged off and each flow node in the graph only includes one instruction.

At 63, the GEN and KILL information for each flow node is calculated. According to one embodiment of the present invention, the cost estimation module 42 of FIG. 4 calculates the GEN and KILL information for each flow node. This means that a bit in the bit-set that represents a spilling home location is set at "1" (i.e., GEN) if the spilling home location is accessed by the current flow node (or instruction). That bit will be set at "0" (i.e., KILL) if the current flow node does not access the spilling home location the bit represents.

At 64, the cost matrix among all register spilling home locations is generated. According to one embodiment of the present invention, the cost estimation module 42 of FIG. 4 first calculates the cost between two spilling home locations based on the above-described data flow analysis. The cost estimation module 42 then generates the cost matrix among all spilling home locations. The cost estimation module 42 uses the following technique to calculate the cost between two spilling home locations and to generate the cost matrix. Assume the in-degree of current flow node is N and the spilling home location accessed by the current instruction is $A_1$, for any of the spilling home locations different from $A_1$ in the OUT bit-vector of each predecessor of current flow node, noted by $A_2$, the cost between $A_1$ and $A_2$ is increased by 1/N.

FIG. 7 shows the memory block assignment process performed by the memory block assigning module 44 of FIG. 4. As can be seen from FIG. 7, the memory block assignment process starts with the initial operation (i.e., blocks 71–72 in FIG. 7).

At 71, the memory block assigning module 44 of FIG. 4 assigns each spilling home location in one partition. As a result, the number of the partitions is initially equal to the number of spilling home locations. The spilling home locations are arranged in a value-descending order based on their estimated cost in the cost matrix.

At 72, the memory block assigning module 44 of FIG. 4 determines the total number of entries (i.e., N) in each memory block. In this case, N should be $2^n$, wherein n is an integer. In addition, the memory block assigning module 44 of FIG. 4 sets the initial value of a variable M to one.

At 73, the memory block assigning module 44 of FIG. 4 merge every two partitions into one partition. As described above, the spilling home locations are arranged in a value-descending order based on their cost in the cost matrix. As a result, the partitions are accordingly arranged. Thus, merging two partitions together results in the cost difference between the partitions to become ZERO.

At 74, the memory block assigning module 44 of FIG. 4 recalculates the cost matrix of the merged partitions. Here, the recalculation does not involve any data flow analysis of the instructions and is only based on the cost matrix previously generated. Thus, this recalculation is merely an updating operation.

At 75, the memory block assigning module 44 of FIG. 4 increases M by letting its value to be the number of spilling home locations within a partition. Here, the partition means the merged partition.

At 76, the memory block assigning module 44 of FIG. 4 determines if M is of equal value as N. If not, then the memory block assigning module 44 of FIG. 4 returns to block 73 to repeat the partition-merging operation. If M is of equal value as N (i.e., the number of spilling home locations in a partition is equal to the number of entries within a memory block), the process ends at 77.

The following lists one pseudo-code implementation of the spilling home location assigning module 40 (FIG. 3). As will be seen from the following pseudo-code, the calculation process of GEN, KILL, IN, and OUT is not shown.

```
Construct the simplified flow graph with each node contains one instruction that accesses the register
spilling home location;
Calculate GEN[i] and KILL[i] for each flow node;
Use the forward disjunctive data flow analysis to calculate IN[i] and OUT[i];
Patch M, the number of spilling home locations to be the multiple N, size of the local memory
block;
Calculate the initial cost matrix based on the data flow information;
Create M partitions with each contains one spilling home location;
Iterate the following loop body for n times, where 2ⁿ == N
{
    for (each cost matrix element Cost[pᵢ, pⱼ] according to the value-descendant order)
        Merge pᵢ and pⱼ into a new partition if neither of them has been merged with another
        partition;
    Recalculate the cost matrix for the merged partitions;
}
for (each partition Pᵢ formed through the above n iterations)
{
    Assign a local memory block Bi to Pᵢ;
```

-continued

```
  Create a 1:1 map MAP[i] between each local memory entry inside Bi and each spilling home
    location inside P_i;
}
MAP[i] (i=1, 2, ... M/N) is the final result which decide the layout of all spilling home locations.
```

The technique described above in accordance with embodiments of the present invention can also be applied to register allocation. For example, if the memory (e.g., local memory) is taken as register resource instead of spilling home location, the above-described technique in accordance with one embodiment still applies. As a further example, the technique described above can be employed to optimize any memory access that requires the "base-address-plus-offset" accessing mechanism and the base address needs to be aligned to a constant value.

FIGS. 6 and 7 are flow charts illustrating a cost estimation process and a memory block assignment process according to embodiments of the present invention. Some of the procedures illustrated in the figures may be performed sequentially, in parallel or in an order other than that which is described. It should be appreciated that not all of the procedures described are required, that additional procedures may be added, and that some of the illustrated procedures may be substituted with other procedures.

In the foregoing specification, the embodiments of the present invention have been described with reference to specific exemplary embodiments thereof. It will, however, be evident that various modifications and changes may be made thereto without departing from the broader spirit and scope of the embodiments of the present invention. The specification and drawings are, accordingly, to be regarded in an illustrative rather than restrictive sense.

What is claimed is:

1. A compiler, comprising:
    a location-assigning module to optimally allocate register locations in various memory blocks of a memory during compilation of a program code in accordance with proximity of program instructions within the program code in accessing the register locations and a size of each of the memory blocks.

2. The compiler of claim 1, wherein the register locations are register spilling home locations and the memory is a local memory within a processor.

3. The compiler of claim 1, wherein the location-assigning module further comprises:
    a cost estimation module to estimate cost between any two adjacent locations using a dataflow analysis;
    a memory block assigning module to assign the register locations based on the estimated cost between any two adjacent locations in order to increase runtime performance of the compiled code.

4. The compiler of claim 3, wherein the dataflow analysis is a forward disjunctive dataflow analysis.

5. The compiler of claim 3, wherein the cost estimation module estimates the cost between any two locations by determining the number of initialization operations to any base address register for any memory block that are required to access these two locations if the two adjacent locations were not put into the same memory block.

6. The compiler of claim 3, wherein the memory block assigning module assigns the register locations by allocating several register locations in a same memory block if the estimated cost among them is relatively high according to a sorting result.

7. The compiler of claim 3, wherein the memory block assigning module assigns the register locations by:
    assigning each register location in a partition and arranging the partitioned register locations in a value-descending order based on their estimated cost, wherein each partition assumes that cost of its assigned register location;
    determining the number of entries in each of the memory blocks;
    merging every two partitions into one and calculating the cost between any two adjacent partitions;
    determining if the number of register locations within each partition is equal to the number of entries within each of the memory blocks; and
    if not, continue merging every two partitions according to the calculated cost and recalculating the cost of each merged partition until the number of register locations within each partition is equal to the number of entries within each of the memory blocks.

8. A method of compiling a program code, comprising:
    optimally allocating register locations in various memory blocks of a memory during compilation of the program code in accordance with proximity of program instructions within the program code in accessing the register locations and the size of each of the memory blocks.

9. The method of claim 8, wherein the register locations are register spilling home locations and the memory is a local memory within a processor.

10. The method of claim 8, wherein optimally assigning register locations further comprising:
    estimating cost between any two adjacent locations using a dataflow analysis;
    assigning the register locations based on the estimated cost between any two adjacent locations in order to increase runtime performance of the compiled code.

11. The method of claim 10, wherein the dataflow analysis is a forward disjunctive dataflow analysis.

12. The method of claim 10, wherein estimating the cost between any two adjacent locations further comprises determining the number of initialization operations to any base address register for any memory block that are required to access these two adjacent locations if the two adjacent locations were not put into the same memory block.

13. The method of claim 10, further comprising generating a cost matrix for all register locations.

14. The method of claim 10, wherein assigning the register locations based on the estimated cost between any two adjacent locations further comprising assigning a same memory block to several register locations if the estimated cost among them is relatively high according to a sorting result.

15. The method of claim 10, wherein assigning the register locations based on the estimated cost between any two adjacent locations further comprising:

assigning each register location in a partition and arranging the partitioned register locations in a value-descending order based on their estimated cost, wherein each partition assumes the cost of its assigned register location;

determining the number of entries in each of the memory blocks;

merging every two adjacent partitions into one and calculating the cost between any two adjacent partitions;

determining if the number of register locations within each partition is equal to the number of entries within each of the memory blocks; and if not, continue merging every two adjacent partitions according to the calculated cost and recalculating the cost of each merged partition until the number of register locations within each partition is equal to the number of entries within each of the memory blocks.

16. A machine-readable medium having stored thereon sequences of instructions, the sequences of instructions including instructions which, when executed by a processor, cause the processor to perform:

optimally allocating register locations in various memory blocks of memory during compilation of the program code in accordance with proximity of program instructions within the program code in accessing the register locations and the size of each of the memory blocks.

17. The machine-readable medium of claim 16, wherein the register locations are register spilling home locations and the memory is a local memory within a processor.

18. The machine-readable medium of claim 16, wherein optimally assigning register locations further comprising:

estimating cost between any two adjacent locations using a dataflow analysis;

assigning the register locations based on the estimated cost between any two adjacent locations in order to increase runtime performance of the compiled code.

19. The machine-readable medium of claim 18, wherein the dataflow analysis is a forward disjunctive dataflow analysis.

20. The machine-readable medium of claim 18, wherein estimating the cost between any two adjacent locations further comprises determining the number of initialization operations to any base address register for any memory block that are required to access these two adjacent locations if the two adjacent locations were not put into the same memory block.

21. The machine-readable medium of claim 18, further comprising generating a cost matrix for all register locations.

22. The machine-readable medium of claim 18, wherein assigning the register locations based on the estimated cost between any two adjacent locations further comprising assigning a same memory block to several register locations if the estimated cost among is relatively high according to a sorting result.

23. The machine-readable medium of claim 18, wherein assigning the register locations based on the estimated cost between any two adjacent locations further comprising:

assigning each register location in a partition and arranging the partitioned register locations in a value-descending order based on their estimated cost, wherein each partition assumes the cost of its assigned register location;

determining the number of entries in each of the memory blocks;

merging every two adjacent partitions into one and calculating the cost between any two adjacent partitions;

determining if the number of register locations within each partition is equal to the number of entries within each of the memory blocks; and if not, continue merging every two adjacent partitions according to the calculated cost and recalculating the cost of each merged partition until the number of register locations within each partition is equal to the number of entries within each of the memory blocks.

24. The machine-readable medium of claim 16, wherein the machine-readable medium is one selected from a group comprising a memory within a computer system, a hard drive, a compact disc, a zip drive card, a tape, a floppy disc, and a non-volatile memory card.

* * * * *